United States Patent [19]

McNeal

[11] 4,100,005

[45] Jul. 11, 1978

[54] METHOD OF MAKING A DYNAMOELECTRIC MACHINE INSULATOR

[75] Inventor: Walter P. McNeal, Holland, Mich.

[73] Assignee: General Electric Company, Fort Wayne, Ind.

[21] Appl. No.: 536,946

[22] Filed: Dec. 23, 1974

Related U.S. Application Data

[63] Continuation-in-part of Ser. No. 333,786, Feb. 20, 1973, Pat. No. 3,880,194.

[51] Int. Cl.² .................... B29C 27/08; B29D 23/10; B32B 31/00
[52] U.S. Cl. .................................. 156/73.1; 156/218; 156/250
[58] Field of Search ................. 310/43, 71, 214, 215; 156/73.1, 73.4, 580; 228/218, 250

[56] References Cited

U.S. PATENT DOCUMENTS

| | | | |
|---|---|---|---|
| 2,701,317 | 2/1955 | Herman | 310/215 |
| 3,365,349 | 1/1968 | Daniels et al. | 156/580 |
| 3,615,968 | 10/1971 | Ceresa et al. | 156/73.4 |
| 3,671,366 | 6/1972 | Miller | 156/580 |
| 3,735,169 | 5/1973 | Balke et al. | 310/214 |

*Primary Examiner*—Douglas J. Drummond
*Attorney, Agent, or Firm*—Ralph E. Krisher, Jr.

[57] ABSTRACT

Electrical insulators are formed from insulative strip material by providing a substantially continuous ultrasonically welded seam. In one embodiment a tubular insulator for covering stator winding connections is formed by continuously moving the strip and a strip of dissimilar material about a cylindrical former having its axis in generally the same direction as the direction of elongation and motion of the strips to thereby form a multiple layer sleeve with a seam being ultrasonically formed to include the two edges of the strip of polyester material. In a second embodiment two or more parallel elongated narrow flat strips are moved in their direction of elongation with a plurality of flat sheets of polyester material being ultrasonically bonded thereto along a substantially continuous seam on the individual sheets with the individual sheets occurring at uniform intervals along the strips to thereby form a ladder-like strip of insulators. In both embodiments the strip is periodically severed after bonding to form individual insulators. In the case of the second embodiment this severing occurs along a line substantially perpendicular to the direction of elongation of the strips, and in a manner to separate the flat sheets into two approximately equal pieces to thereby form phase insulators for stator windings. Substantially continuous ultrasonically formed seams are achieved with surprisingly little tool wear. Tools are case hardened at least along the surface engaging portions or welding tips thereof. Relatively continuous welded seams are achieved by providing ultrasonic vibrations to the tool tip.

14 Claims, 12 Drawing Figures

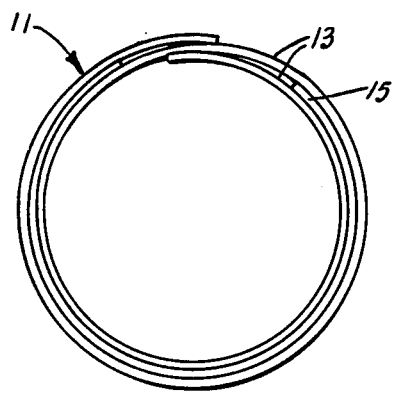
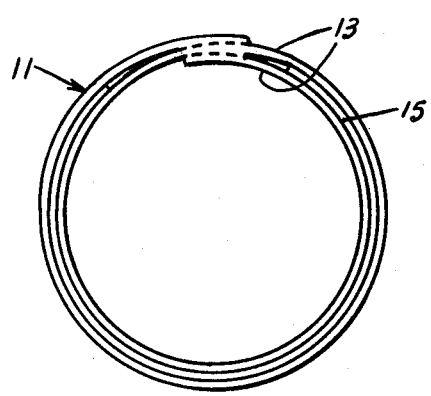
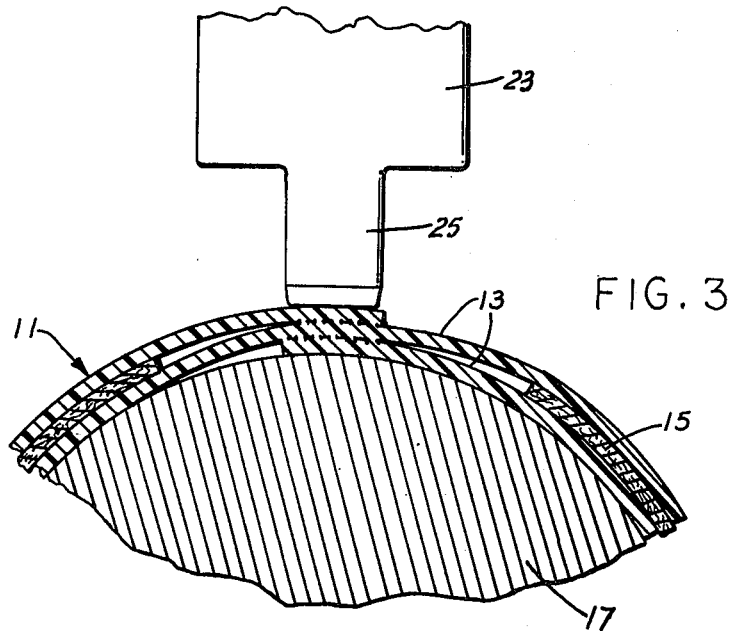

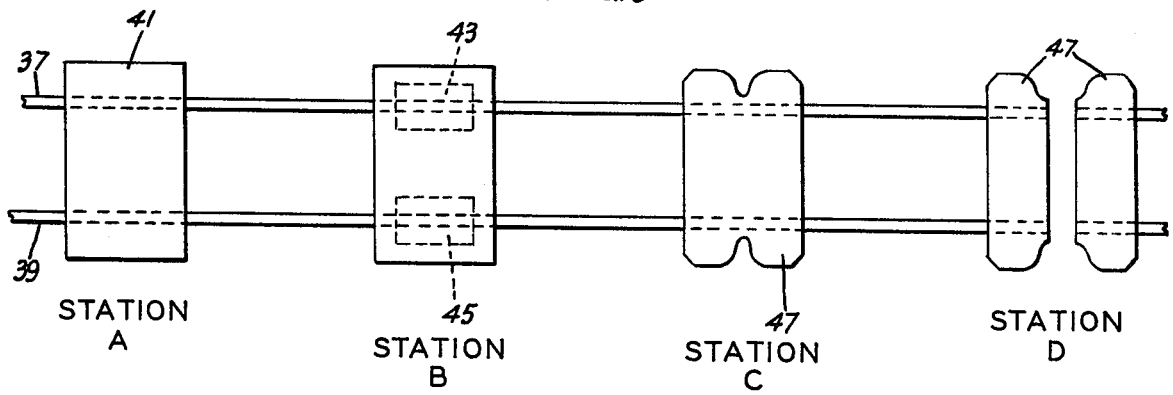
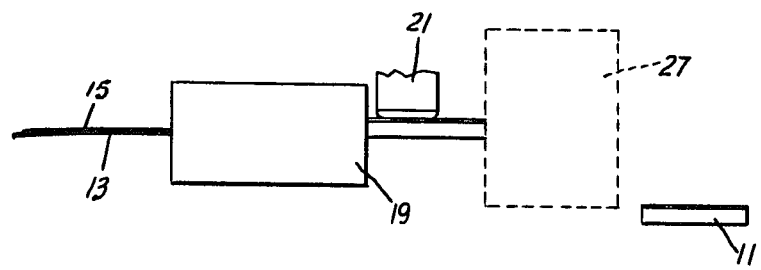
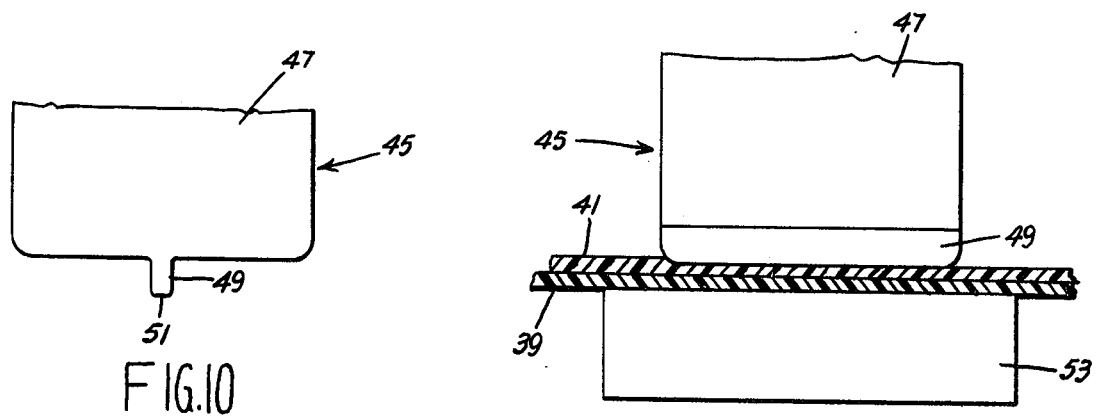

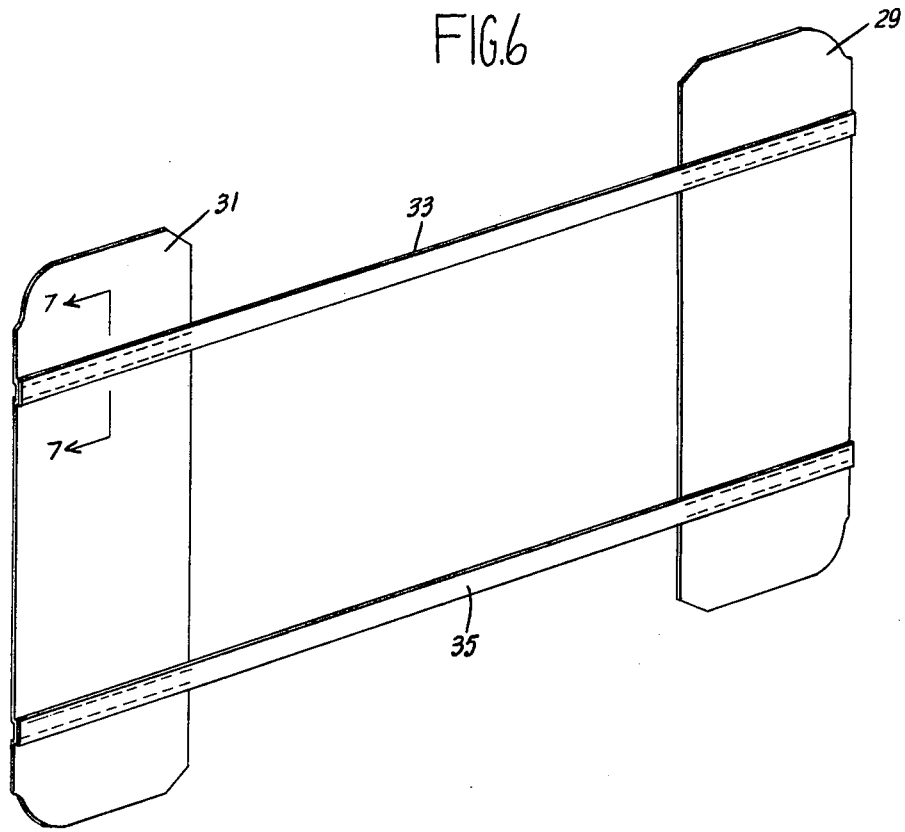
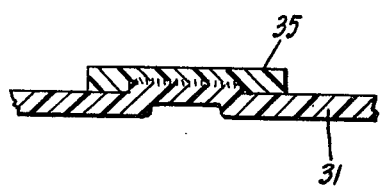

METHOD OF MAKING A DYNAMOELECTRIC MACHINE INSULATOR

CROSS REFERENCE TO RELATED APPLICATIONS

This application is a continuation-in-part of my copending application Ser. No. 333,786 filed Feb. 20, 1973, and the entire disclosure of said copending application is incorporated herein by reference that application issued as U.S. Pat. No. 3,880,194 on Apr. 29, 1975.

U.S. Pat. No. 3,748,510, which issued July 24, 1973 from my application filed Oct. 26, 1971, assigned to the assignee of this application is a related patent, and the entire disclosure of said patent is incorporated herein by reference.

BACKGROUND OF THE INVENTION

The present invention relates to apparatus and methods for joining together different pieces of materials along a continuous ultrasonically welded seam to form electrical insulators; and to a new and improved insulator for use in dynamoelectric machine stator assemblies.

The manufacture of dynamoelectric machines has developed into a highly sophisticated industry. In the manufacture of wound stators for such machines, coils may be wound on a coil form and then inserted into the stator; or the wire for forming such coils may be directly dispensed into the stat or slots in a so-called "in-slot" winding process. In either approach various insulators are employed in addition to the typical ground insulation that is immediately adjacent to coil accommodating surfaces of the core. For example, an exemplary stator slot may have a cuffed stator slot wedge or slot liner, such as illustrated in U.S. Pat. No. 2,935,859, inserted therein before any wire is deposited in that slot, although slot insulation may also take the form of an epoxy or other resinous coating. With the slot liner in place, a first phase winding may then be inserted in the slot to be followed by a phase insulating wedge or separator. Next, a second winding is inserted in this slot and, lastly, an insulating wedge is inserted in the slot. In this example, where two different phase windings occupy the same slot, it is also desirable to provide additional insulation between the end turns of the two different phases. This additional end turn insulation is sometimes called "window" insulation in the art, and an example of such an approach is shown in U.S. Pat. No. 2,701,317, which was assigned to the assignee of this application. There may also occur connections between different pole windings of the stator and connections from such windings to the stator leads. To insulate such connections, there may be provided additional insulators often in the form of insulators or sleeves such as those disclosed in U.S. Pat. No. 3,219,857 (which is assigned to the assignee of this application), which fit over the interconnected wires and to either side of a particular point of connection. Since these interpole or external lead connections are often soldered, sharp protrusions may be present, and the tubular insulators should be particularly rugged. Stator insulators have at one time or another been manufactured of paper and also of polyester materials, such as polyethylene terephthalate which may be purchased under the trade name "Mylar" polyester. The polyester materials have proven to be particularly desirable materials because of their strength, good electrical insulating properties, and compatibility with lubricants and refrigerants normally encountered in hermetically sealed refrigeration compressor motor parts.

In a hermetically sealed compressor environment, quality of insulation is particularly important since such insulation comes in contact with refrigerant and lubricants employed in the refrigeration system and any insulation failure may result in loss of not only the motor but an entire compressor unit. Any moisture which might be present in the insulators at the time of assembly could of course lead to system damage if that moisture were to subsequently freeze and block the refrigerant circulation path. Because of those considerations such insulators are now almost universally fabricated from synthetic materials, of which polyethylene terephthalate or Mylar polyester will be taken as exemplary throughout the present specification.

While polyethylene terephthalate is particularly suited to the hermetic motor environment, it can be a difficult material to work with and is rather costly. Heating this material in an attempt to bind two pieces of polyester sheet material together results in a thermal degradation of the material which not only weakens the material but also changes its chemical properties somewhat so that the material may be more prone to absorb moisture. Also, if it is overly heated refrigerants such as Freon may later cause a molecular particle to leave the insulator and contaminate the freon base refrigerant. Attempts have been made to bond two sheets of polyethylene terephthalate together by ultrasonic spot welding techniques. However, such welds are not characterized by great strength, and I have found that ultrasonic welding of such material is so detrimental to the ultrasonic welding tips that such tips would rapidly wear away and require replacement. Adhesive or solvent bonding of polyester to polyester is expensive, does not result in particularly strong bonds, and introduces undesirable materials which again may be detrimental in a refrigerant compressor environment.

Present production techniques of, for example, phase insulators is to cut thee insulator from a flat sheet of material and discard almost as much material as is retained for the end turn or phase insulator. The cost of discarding such a substantial quantity of insulating material is of course substantial.

It is accordingly a general object of the present invention to overcome one or more of the foregoing problems.

It is another object of the present invention to provide new and improved electrical insulators from strip insulating material.

A further object of the present invention is to provide a new and improved method for fabricating connection insulators for interpole and winding lead connections in dynamoelectric machines.

A still further object of the present invention is to provide a new and improved and economical phase insulator for dynamoelectric machine stator windings.

Still another object of the present invention is to join polyester materials together without degrading the materials.

A yet further object of the present invention is to effect a substantially continuous polyester material to polyester material ultrasonically welded seam and improved apparatus for use therewith.

It has been recognized in the art that ultrasonic welder tip wear is a substantial problem, and particularly so in connection with welding polyester materials such as polyethylene terephthalate. In fact, the industry makes use of exotic welder tip materials such as titanium alloys, in an effort to reduce welder tip wear. Attempts to harden the tip or portion of the machinery which transmits the ultrasonic vibrations to the material being processed have not been successful, since hardening the vibration transmitting material would substantially diminish its vibration transmitting capabilities. In addition, hard or brittle materials would rupture, crack or break when driven with sufficient energy to ultrasonically weld a work piece.

It is accordingly another specific object of the present invention to overcome the problems associated with wear of an ultrasonic welding tip.

Still another object of the present invention is to provide a wear resistant tip for an ultrasonic device which retain its vibration transmitting efficiency.

SUMMARY OF THE INVENTION

In carrying out the above and other objects in preferred embodiments, I provide a system for the production of polyester insulators that may be used in motor parts for hermetically sealed compressor applications. One form of insulator is used to separate end turns of different winding phases; and another form is used to cover winding connections. In the another form, the insulators comprise generally tubular laminated electrical insulating sleeves having two wall areas which are, for example, three layers thick. The insulator includes a section along which a continuous weld seam is formed. In one three layer area, a material such as DuPont's Nomex polyamide insulating material is sandwiched between two sheets or layers of a polyester material such as Du Pont's Mylar polyester material. An exemplary three layered insulator may comprise one sheet of Mylar material and one sheet of Nomex material, but formed about a cylindrical rod so that the Mylar sheet is wrapped upon itself and overlapped so that a polyester to polyester to polyester ultrasonic bond may be established and thus also form a three layer area.

In the above mentioned one form, the insulators may be used for "phase" or end turn insulation; and comprise at least one strip of relatively flat insulation having at least one elongate narrow strip of polyester material ultrasonically welded thereto. Preferably, two insulating strips are held together with two elongate narrow strips by continuously welded seams running generally in the direction of the elongate strips. Each flat sheet may be cut in a direction substantially perpendicular to the longitudinal direction of the elongate strips so as to form two end turn insulating portions from each flat sheet. The substantially continuous ultrasonically welded seam or polyester to polyester bond is achieved with an ultrasonic welding tip made of conventional cold rolled steel but having the surface thereof hardened. Surprisingly, this provides a work piece engaging surface which is not plagued by problems of wear and yet provides an ultrasonic welding tip having good vibration transmitting characteristics.

In preferred forms of the invention, the substantially continuous ultrasonical welding is accomplished so that no unattached extremities of the elongate narrow strip exist.

BRIEF DESCRIPTION OF THE DRAWING

The aforementioned and other objects, features, and advantages of the present invention will become more apparent from the following detailed description thereof when considered in conjunction with the drawings. However the exemplifications set out herein illustrate the preferred embodiments of the invention in one form thereof, and such exemplifications are not to be construed as limiting in any manner.

FIG. 1 is a side view of a winding connection insulator embodying the present invention in one form;

FIG. 2 is an end view of the insulator of FIG. 1 after forming and prior to ultrasonic welding;

FIG. 3 illustrates the ultrasonic welding or bonding of a continuous seam on the insulator of FIG. 1;

FIG. 4 is an end view like FIG. 2 but after the welding process has been performed;

FIG. 5 illustrates an overall method of forming the insulator of FIG. 1;

FIG. 6 is a perspective view of a fabricated phase insulator embodying the invention in another form;

FIG. 7 is a sectional view along the line 7—7 of the insulator of FIG. 6 illustrating the fused bond thereof;

FIG. 8 illustrates a method of fabricating the insulator of FIG. 6;

FIG. 9 illustrates the continuous ultrasonic welding step of FIG. 8;

FIG. 10 is an end view of the ultrasonic welding tip shown in FIG. 9;

DESCRIPTION OF THE PREFERRED EMBODIMENT

Figure 11:
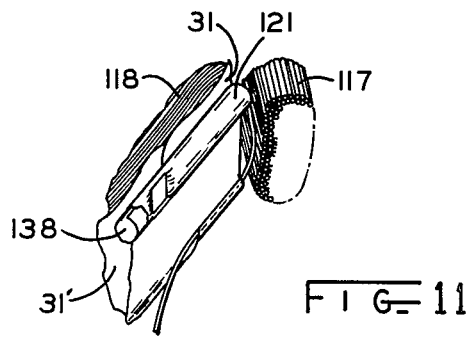
FIG. 11 is a view, with parts removed and parts broken away, that illustrate the interrelationships of a phase insulator and a connection insulator of my U.S. Pat. No. 3,748,510.

The structure of the insulator 11 of FIGS. 1 through 5 is most easily understood beginning with FIG. 2 which shows an end view of that insulator 11 after it is formed but before being ultrasonically welded. The insulator comprises a strip 13 of polyester material (e.g., Mylar) which is wrapped about itself into a cylindrical form and of a diameter so as to complete slightly more than two complete revolutions. This allows the two edges of the strip 13 to overlap for subsequent welding. Before forming the strip in this manner a second strip 15 of a dissimilar material such as the Nomex material is superimposed on the strip 13 so that in the forming process the Mylar makes at least one complete revolution about a former so as to prevent the strip 15 from coming into contact with the former. The Mylar and Nomex (both of which names are registered trademarks of E. I. du Pont de Nemours and Company) strips are continuously fed to a former so as to continuously create a tubular structure having a cross section like that illustrated in FIG. 2. As is well known to persons of ordinary skill in the art, Nomex strip (or sheet) material is a high temperature-resistant nylon paper that is a polyamide material.

The former itself may comprise a cylindrical rod 17 as shown partially in cross section in FIG. 3. The width of the strip 13 is somewhat greater than twice the girth of the cylindrical rod 17 so that the strip 13 will wrap about the rod 17 somewhat more than twice, and the width of the strip 15 is somewhat less than the girth (or circumference) of rod 17. The strip 15 is asymmetrically placed on the polyester strip 13 so that material 13 is exposed along one side thereof, and such exposed side is started about the rod 17 so that the configuration of FIG. 2 will result. The process of forming the continuously fed superimposed strips 13 and 15 into the configuration illustrated in FIG. 2 is accomplished by the former 19 of FIG. 5, and is not set out in further detail here, since it is not necessary to an understanding of the present invention. Once the material is formed into the configuration shown in FIG. 2, that portion of its periphery having three adjacent layers of strip 13 is passed under the welding head 21 of FIG. 5. As the laminated tube 11 passes under welding head 21, it is still wrapped about the cylindrical rod 17 which functions to support the material under the welding head 21. The rod 17 may be supported within the former 19 in cantilever fashion and may be counterbalanced for example, so to force the polyester material upwardly toward the welding head 21. Alternatively, the rod 17 may be fixed in cantilever fashion and the welding head 21 biased toward rod 17 so as to exert pressure on the three layers of strip 13 between the welding tip and rod 17. The welding head itself is seen in greater detail in FIG. 3 and may comprise a vibration transmitting portion or shank 23; and a tip 25. These two portions are rigidly connected, in a mechanical sense, and may be formed as integral members or the tip 25 may be formed as a separate replaceable portion. The tip 25 is caused to vibrate at an ultrasonic rate by standard ultrasonic welding techniques.

For example, the welding device may have a power supply for providing electrical energy, means for converting the electrical energy into mechanical energy, and means for transferring the mechanical energy by way of the vibration transmitting portion 23 to the tip 25. The tip 25 is continuously ultrasonically energized and the sheets 13 and 15 are continuously moved past the tip 25 so as to provide a continuous seam or bond between the three layers of polyester material 13. The ultrasonic vibrations cause motion between the polyester layers, thus inducing frictional heat along their surfaces sufficient to fuse the materials together in the area of the weld without, however, heating the material 13 to a point where thermal degradation takes place.

As noted earlier, the welding tips used in the ultrasonic welding of polyester materials experience excessive wear. I can now overcome that problem by making the tip 25 of cold rolled or cold drawn steel and then case hardening at least the work engaging portion thereof. This case hardening (or other suitable surface hardening) of the welding tip does not substantially diminish its vibration transmitting characteristics, but does provide an extremely hard surface that is not readily worn away as strip 13 is moved therepast.

As the material of tube 11 passes beyond the welding head 21 of FIG. 5, it has the configuration illustrated in FIG. 4, where dotted lines illustrate the weld regions between the three layers of material 13. As seen in FIG. 4 the tube 11 is formed as a generally tubular, laminated, electrical insulating sleeve having two wall areas which are three layers thick. However, it should be clear that the process of forming these materials about the cylindrical rod 17 could for example, include several more revolutions of the polyester material about the rod and could include additional Nomex layers as well.

With reference again to FIG. 5, after welding, the tube continues to a station indicated generally as 27 where it is periodically severed so as to form the individual insulators 11. In one preferred embodiment, interpole and winding lead connection insulators for hermetically sealed refrigeration units were manufactured in accordance with the present invention employing a cylindrical rod 17 having a one quarter inch diameter. The Mylar-Nomex-Mylar insulating sleeves produced were about 9/32 of an inch in diameter. The Mylar was about 0.003 to 0.005 inches thick and 1⅛ inches wide; while the Nomex was 0.003 inches thick and ⅞ of an inch wide. Both materials were fed to station 19 from reels of strip material. The severing device 27 was actuated at a rate such as to produce insulators 11 having an axial length of slightly over 2 inches.

Ladder-like insulators of the same general configuration as that illustrated in perspective in FIG. 6 are employed in dynamoelectric machine stators where the end portions 29 and 31 function to separate the end turns of different winding phases. The connecting portions or segments 33 and 35 pass along a pair of stator slots between the end faces of the stator core. The width of the connecting portions 33 and 35 must be such that they will fit within stator slots and the distance between the two end portions 29 and 31 should be slightly greater than the axial length of the stator in which the insulator of FIG. 6 is to be used. The distance between the end portions 29, 31 can be varied as required to satisfy the needs of stators of different axial lengths, while the connecting portions 33, 35 must be small enough to easily enter stator slot openings.

Insulators as generally illustrated in FIG. 6 have been made heretofore by relatively expensive processes. For example, an entire insulator has been cut from a single wide strip of polyester material in which case the window between end portions 29 and 31, and between the connecting portions 33 and 35 would represent a large and expensive piece of scrap. Of course, smaller scrap portions from the area outside the two connecting portions 33, 35 would also result.

Polyester material is relatively expensive, and discarding such a large percentage of the material as scrap leads to relatively expensive end turn insulators. In an attempt to eliminate this costly scrap, two narrow strips of polyester material have been provided with two end portions spot-welded thereto. However spot-welds often involve a relatively small welded mass of material and therefore tend to lack adequate strength and may break free during the stator assembly process resulting in a rejected stator. The new and improved end turn insulator of FIG. 6 is now made possible by an economical and reliable process illustrated in FIG. 8, which process is somewhat analogous to the process presented by FIG. 5.

In FIG. 8, a plurality (such as two) of parallel elongated narrow flat strips of polyester material 37 and 39 are continuously fed toward the right in FIG. 8 from a pair of reels of such material. Alternately, material may be fed from a single reel across means for splitting the single strip into the two strips 37 and 39.

A plurality of flat sheets 41 of polyester material are then disposed along the parallel strips 37, 39 (for example, by feeding wide strip material in a direction generally perpendicular to that of the narrow strips and periodically severing such wide strip to deposit a flat sheet 41 on the two narrow strips). The discrete pieces 41 and strips 37, 39 pass under a pair of ultrasonic welding heads, each disposed in alignment with a path of a respective one of the strips, illustrated in dotted lines as 43 and 45. These ultrasonic welding heads from a continuous ultrasonic weld and secure or fasten the discrete pieces 41 to the pair of narrow strips 37, 39; thus forming a ladder-like strip of relatively flat electrical insulators. These insulators may subsequently be cut or blanked out to the form or contour illustrated at 47. Thereafter, pieces 47 are severed along a line substantially perpendicular to the direction of travel of the strips 37 and 39, so that a single discrete piece such as piece 41 ultimately forms one end portion 29 of one insulator and the other end portion 31 of another insulator. As clearly revealed in FIG. 6, ultrasonic welding is accomplished so that no unattached extremities of the legs or strips 33, 35 exist. Thus, loose ends that may snag or catch on windings or on a stator core are avoided. In addition, it will be noted from FIG. 6 that the legs 33, 35 and end pieces 29, 31 are welded together along substantially the entire extent of the mutually overlapping or overlapping portions thereof.

Figure 12:
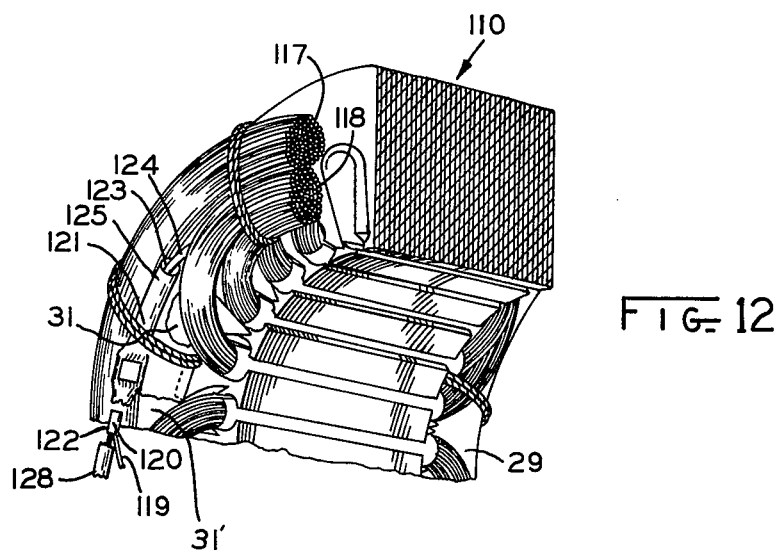
FIG. 12 is a view in perspective, partially broken away to show detail, of a portion of a stator assembly after it has been fabricated, with the connection insulator from my U.S. Pat. No. 3,748,510 installed and winding end turns compacted and tied and with phase insulators therebetween.

FIGS. 11 and 12 show the phase insulator of FIG. 6 as it is typically employed in a stator assembly 110 of a dynamoelectric machine. The use of such insulator is well known to those skilled in the art, therefore FIGS. 11 and 12 will not be explained in great detail. A connection insulator 121, of my U.S. Pat. No. 3,748,510, is shown only for illustration purposes, but it will be understood that tubular insulator 11 of FIG. 1 could be used in a similar manner. Therefore, as e illustrated, the phase insulator will provide a layer of insulation between connections contained within insulator 121 and winding end turn portions 117, 118. Accordingly, with wall 138 of the insulator 121 positioned against a face of phase insulator portions 31 and 31' a double layer of positive insulation between winding end turn portions 117, 118 adjacent thereto and connections will be provided. Phase insulator portion 29 is positioned between end turn portions of different winding phases at the opposite end of stator core 111 from phase insulator portion 31. For completeness of description, it should be noted that connection receiving portion 125 of insulator 121 includes a receptacle, open at 123, that receives a connection with external lead wire 124. Another external lead wire 128 is connected to winding lead wire 119. The connection 122 has been formed with a mechanical crimp type connection 120.

More specifically and as clearly taught by the schematic representation of FIG. 8, a piece 41 of electrical insulating material is positioned in overlapped relationship across strips 37, 39 at Station A. Piece 41 may be a pre-cut segment of insulating material or may be a portion of a continuous length of insulating material that is fed into overlapping relationship relative to the parallel strips 37, 39, and then severed to make piece 41. At Station B ultrasonic welding heads 43, 45 weld the relatively overlapped or overlayed portions of piece 41 and strips 37, 39 together. Welding heads 43, 45 are shown in dotted lines and it is preferable to have them located adjacent to piece 41; therefore at Station A piece 41 is positioned above or below strips 37, 39, depending on whether heads 43, 45 are above or below strips 37, 39. Portions of piece 41 are removed at Station C to give piece 47 a contoured configuration better illustrated by severed pieces 47 at Station D. The ultrasonic weld has attached extremities of strip 37, 39 to pieces 47 as illustrated at Station D. Piece 47 could be severed simultaneously with the forming step accomplished at Station C, but it is preferred to contour or form the shape (configuration) of piece 47 at Station C and subsequently sever two adjacent pieces 47 (e.g., at another Station D) as clearly represented in FIG. 8.

The ultrasonic welding heads 43 and 45 join each flat sheet 41 to the strips 37 and 39 along a substantially continuous seam running generally in the direction of elongation of the strips 37 and 39. Welding head 45 (it being noted that head 43 is the same as head 45) is better illustrated in FIGS. 9 and 10.

FIG. 10 illustrates the welding head 45 looking in the direction of elongation of the strips 37 and 39. Welding head 45 comprises a vibration transmitting portion 47, and a tip portion 49. The tip portion 49 has a work piece engaging surface 51 which, as illustrated in FIG. 9, cooperates with a support member 53. The support member and work piece engaging surface 51 are biased toward one another in known fashion, with the two superposed pieces of polyester material 39 and 41 therebetween. The vibration transmitting portion 47 transmits ultrasonic vibrations to the work piece engaging surface 51. This in turn induces a weld along the interface of layers 39 and 41. At least the work piece engaging surface 51 is surface hardened to prevent excessive wear due to the continuous nature of the weld. However, the vibration transmission characteristics of the tip are not adversely affected. Moreover, cracking of hardened tip surfaces has not been experienced.

As seen in FIGS. 7 and 9, the ultrasonic welding process causes a slight diminution in thickness of the joined materials. The typical polyethylene terephthalate insulating strips employed to make the insulator of FIG. 6 were about 0.003 inches thick, but the resulting thickness of a typical weld region was only about 0.004 inches thick. However, this 0.002 inch loss of total two layer thickness does not impair the insulating qualities of the resulting product.

The art of sonically or ultrasonically welding has previously been developed and is represented, for example, by patents that are assigned to Branson Instruments, Incorporated, of Stamford, Conn. Some of the Branson owned patents, the disclosures of which are incorporated herein by reference, are U.S. Pat. Nos. 3,224,916; 3,367,809; and 3,499,808. As previously stated, common materials (e.g., cold drawn or cold rolled steel) may be used for welding tips after it has been case hardened. The exact degree of hardness of the tip is not critical, so for teaching purposes only, it is noted that the tools herein shown had a surface hardness of about 65, Rockwell C scale; and were case hardened to a depth of about 0.021 of a inch. These tools, when energized at 20,000 hertz, did not crack and did not show evidence of wear when strips 37, 39, and 41 (of FIG. 8) were 0.0075 of an inch thick Mylar; and when strip 13 (FIGS. 2 and 4) was made of different thicknesses (e.g., 0.003, 0.005, and 0.010 of an inch thick) Mylar; even though the tips 21 and 49 were continually energized during formation of insulators embodying the invention as described above.

While the present invention has been described with respect to preferred embodiments thereof, numerous modifications will suggest themselves to those of ordinary skill in the art. Accordingly the scope of the present invention is to be measured only by that of the appended claims.

What I claim as new and desire to secure by Letters Patent of the U.S. is:

1. A method of assembling together at least a portion of one strip of electrically insulating material and at least one other segment of electrically insulating material to form electric motor insulators of the type having at least one first elongate insulation piece for placement in an axially extending slot of a motor core, and having spaced apart insulation pieces for placement between the end turn portions of different phase windings supported on the motor core with the spaced apart insulation pieces interconnected by the at least one first elongate insulation piece, the method comprising the steps of: moving the strip in a longitudinal direction; overlapping a first portion of the strip and the other segment of insulating material; welding together the overlapped segment and first portion of the strip while they are disposed between a support and an energized welding tool; and subsequently severing the strip material along a line transverse to the longitudinal extent thereof so as to form a discrete insulator having at least one elongated insulation piece that can be accommodated in a core slot, and spaced apart insulation pieces connected together by the at least one first elongate insulation piece that can each be disposed between end turn portions of at least two different windings.

2. A mechanical manufacturing method of fabricating an electrical insulator by assembling electrical insulator portions, the method comprising: moving at least two overlapped portions of an electrical insulating material adjacent to an ultrasonic welding device; and securing at least one other portion of electrical insulating material to the at least two portions while the overlapped portions are adjacent to the ultrasonic welding device, and thereafter contouring and cutting individual electrical insulator segments out of at least one of the portions after the ultrasonic weld has been formed.

3. A method of forming insulators from electrically insulative strip material and at least one other electrically insulating material comprising: moving the strip material and the other electrically insulating material about a cylindrical former having its axis in generally the same direction as the motion of the materials; forming a multiple layer sleeve having an inner and outer wall of the strip material; enclosing the other electrically insulating material within the inner and outer walls; and securing the sleeve with an ultrasonic weld along a seam formed by only the strip material.

4. A method of forming insulators from at least one reeled supply of longitudinally extending electrically insulating material and at least one other piece of electrically insulating material comprising the steps of: unreeling a first longitudinally extending portion of insulating material and moving it in a longitudinal direction; relatively overlapping a first portion of the first longitudinally extending portion of insulating material and the at least one other piece of insulating material; ultrasonically welding the first longitudinally extending portion of insulating material and the at least one other piece while the first longitudinally extending portion and at least one other piece are adjacent to an energized ultrasonic welding tool; and severing the first longitudinally extending portion of insulating material along the longitudinal extent thereof so as to form a discrete insulator comprising at least the at least one other piece of insulating material and the first longitudinally extending portion of insulating material.

5. The method of claim 4 wherein a support is provided comprising a rod supported in cantilever fashion with a cylindrical surface thereof lying adjacent to the ultrasonic welding tool, the reeled supply of material is in flat strip form, and the method further comprises: providing a second reeled flat strip of insulating material; superimposing the first and second strips; and forming the superimposed strips about the rod.

6. The method of claim 5 wherein the rod is cylindrical and the width of the first reeled strip is somewhat greater than twice the circumference of the rod; and the width of the second strip of material is somewhat less than the circumference of the cylindrical rod; the step of superimposing further comprising the step of asymmetrically placing the second strip on the first strip so that material of the first strip is exposed along one side thereof; and the step of forming further comprises the step of forming a tubular insulator structure with the material of the second strip sandwiched between spaced apart layers of material of the first strip.

7. The method of claim 6 wherein the material of the second strip is not overlapped on itself and a welded seam is formed only along interfaces between overlapping portions of the first strip of material.

8. The method of claim 4 wherein the at least one other piece of electrically insulating material comprises a piece of material oriented transversely from the longitudinally extending portion of material.

9. The method of claim 4 wherein at least two longitudinally extending portions of electrically insulating material are moved in a longitudinal direction; a plurality of other pieces of insulating material are placed transversely relative to the two longitudinally extending portions of material; and wherein the step of severing comprises severing both longitudinally extending portions along the longitudinal extent thereof.

10. The method of claim 9 wherein one of the pieces of insulating material is severed each time that the strips are severed.

11. The method of claim 9 wherein the longitudinally extending portion and pieces are polyester material.

12. The method of claim 4 wherein the ultrasonic welding tool is formed of common steel, and is provided with a hardened surface.

13. A mechanical manufacturing method of fabricating, by assembling, ladder-like insulators from a plurality of separate insulation pieces, the insulators comprising insulation for an electric motor having a slotted magnetic core, first and second phase windings having portions disposed in slots of the core and end turn portions adjacent the core end faces and wherein at least one first elongate insulation piece extends along one of the core slots, and spaced apart insulation pieces connected together by at least one first elongate insulation piece disposed between end turn portions of the first and second phase windings, the method including assembling the ladder-like insulator from at least one first segment of electrically insulating material and at least one other segment of electrically insulating material and comprising the steps of: moving the at least one first segment in a longitudinal direction; arranging a first portion of the at least one first segment and the at least one other segment of insulating material in mutually overlapping relationship relative to one another; welding the overlapped portions of the at least one other segment and first portion of the at least one first segment together while they are located between a support and an energized welding tool; and forming a contoured configuration to the ladder-like insulator.

14. A mechanical maufacturing method of fabricating by assembling, for an electric motor, insulators from at least one reeled piece of electrically insulating material and at least one other piece of electrically insulating material comprising the steps of: unreeling the piece of insulating material and moving it in a longitudinal direction; arranging a first portion of the piece with the at least one other piece of insulating material so that parts thereof are in overlapping relation and welding the overlapped parts of the first portion of the piece and the at least one other piece while they are located between a support and an energized welding tool to form a weld and thus form a ladder-like structure; and establishing a desired form of a portion of the ladder-like structure after the weld has been formed.

* * * * *

UNITED STATES PATENT AND TRADEMARK OFFICE
CERTIFICATE OF CORRECTION

PATENT NO. : 4,100,005
DATED : July 11, 1978
INVENTOR(S) : Walter P. McNeal

It is certified that error appears in the above-identified patent and that said Letters Patent are hereby corrected as shown below:

Col. 2, line 12, delete "those" and insert --these--;
       line 40, delete "thee" and insert --the--.
Col. 3, line 16, delete "retain" and insert --retains--.
Col. 4, line 26, delete "illustrate" and insert --illustrates--.
Col. 7, line 17, delete "overlapping" and insert --overlaying--.
Col. 10, line 29, after "the" (second occurrence) insert --other--;
       line 33, after "and" insert --other--.

Signed and Sealed this

Twenty-sixth Day of June 1979

[SEAL]

Attest:

RUTH C. MASON
Attesting Officer

DONALD W. BANNER
Commissioner of Patents and Trademarks